Patented Nov. 6, 1945

2,388,562

UNITED STATES PATENT OFFICE 2,388,562

PRESERVING RUBBER

Arthur M. Neal and John R. Vincent, Wilmington, Del., assignors to E. I. du Pont de Nemours & Company, Wilmington, Del., a corporation of Delaware No Drawing. Application July 30, 1943,
Serial No. 496,764

20 Claims. (Cl. 260—809)

This invention relates to the preservation of rubbers and more particularly to novel means for improving the resistance of rubber to deterioration at high temperature.

Many substances have been proposed for addition to rubbers to improve the resistance of the rubbers to deterioration by the action of oxygen and the like. Among the substances proposed for this purpose are secondary aromatic amines, of which N-phenyl-beta-naphthylamine has been widely used. While the secondary aromatic amines of this character have been quite satisfactory at ordinary temperature, they are relatively ineffective at elevated temperatures in the neighborhood of about 120 to 130° C. Other compounds are somewhat more effective at elevated temperatures, but they are usually more difficult and expensive to prepare and thus they have been much too costly for use practically on a commercial scale.

It is an object of the present invention to provide a new and improved method of inhibiting the deterioration of rubbers, particularly at elevated temperatures. Another object is to provide a method for improving the antioxidant properties of secondary aromatic amines in rubbers. A further object is to inhibit the deterioration of rubber by a combination of compounds which combination is more effective than either of the individual compounds. A still further object is to increase the resistance of rubber to deterioration without increasing the amount of antioxidant. Still another object is to inhibit the deterioration of rubber by the use of smaller amounts of antioxidant. Other objects are to provide new compositions of matter and to advance the art. Still other objects will appear hereinafter.

The above and other objects may be accomplished in accordance with our invention which comprises incorporating in a rubber a mixture of antioxidants, which mixture contains about 25% to about 2.5% of a compound of the formula A—CH$_2$—R' wherein A represents a secondary amino group and R' represents an aromatic group having from one to two members of the group of oxy and amino radicals substituted on the aromatic ring attached to the CH$_2$, which compound is devoid of highly polar groups, and about 75% to about 97.5% of a different secondary diaromatic amine devoid of highly polar groups. We have found that such mixture of antioxidants produces an effect which is much greater than that which is produced by either one of the constituents of the mixture alone and which is also greater than the sum of the effects of the constituents. The compounds of the formula A—CH$_2$—R' appear to have a boosting effect on the other secondary aromatic amines to greatly increase the effect of such secondary amines so that the resistance to deterioration of the rubber containing the mixture is markedly increased without increasing the amount of antioxidant and a predetermined increase in the resistance of the rubber to deterioration can be obtained with considerably less antioxidant than would be required otherwise. Accordingly, we refer to compounds of the formula A—CH$_2$—R' as booster compounds. The effects of the mixture of antioxidants make it possible to obtain superior protection of the rubber with no increase in cost or, if desired, equal protection of the rubber at lower cost.

In accordance with our invention, we have found that the broad class of compounds represented by the formula A—CH$_2$—R', as above defined, and particularly those which are devoid of highly polar groups, such as —COOH, —SO$_3$H and —NO$_2$, are very effective booster compounds, boosting or improving the antioxidant properties of other secondary aromatic amines. By "a secondary amino group", in referring to the radical A, we mean a group in which the free valence belongs to the nitrogen and the other two valences of the nitrogen are satisfied by carbon atoms of from one to two organic groups. It will generally be desirable that the two valences of the nitrogen in the secondary amino group, represented by A, be satisfied by separate carbon atoms of one to two hydrocarbon radicals, that is, radicals which consist of the elements carbon and hydrogen. We generally prefer that the two valences of the nitrogen in the secondary amino group be satisfied by the terminal carbon atoms of a chain containing at least four carbon atoms and which may contain in the chain one or more other elements, such as oxygen, sulfur and nitrogen. Where the two valences of the nitrogen are satisfied by the terminal carbon atoms of a chain, the chain will form with the nitrogen a heterocyclic ring and the secondary amino group will then be the radical of a heterocyclic amine, such as piperidine, morpholine, thio-morpholine, the hydropicolines, the hydrolutidines, the hydroquinolines, the hydroisoquinolines, the indoles, pyrrole, pyrroline, pyrrolidine, hexamethylene imine, the piperazines and the like. Preferably, the secondary amino group, represented by A, will be a piperidino group wherein the two valences of the nitrogen are satisfied by the terminal carbon atoms of a hydrocarbon chain of five carbon atoms.

The radical R', in the formula A—CH₂—R', must be an aromatic group having from one to two members of the group of oxy and amino radicals substituted on the aromatic ring which is attached to the CH₂. We employ the term "aromatic group" in its generally understood meaning as one in which the free valence belongs to a carbon atom of a benzene ring. This benzene ring must also carry one or two oxy radicals, one or two amino radicals or both an oxy radical and an amino radical. The oxy radicals include hydroxy, alkoxy, aryloxy and aralkoxy radicals. The amino radicals may be unsubstituted or substituted, that is, 0.1 or 2 amino hydrogens may be replaced with organic groups. The aromatic groups, represented by R', may also carry additional substituents such as alkyl, aryl, aryl-sulfonylamido and halogen groups and the secondary amino groups represented by A may also contain substituents, such as alkyl, aryl, alkoxy, aryloxy, aralkyl, aralkoxy, hydroxy, alkenoxy, amino, arylsulfonylamido and halogen groups.

Representative booster compounds within our invention are:

4-hydroxy-3-(N-piperidinomethyl)-diphenylamine

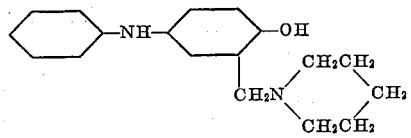

(N-piperidinomethyl)-benzimidazole

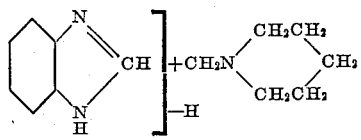

1-(N-piperidinomethyl)-2-(phenylamino)-naphthalene

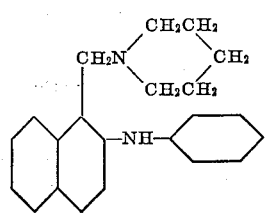

1-hydroxy-4-(N-piperidinomethyl)-naphthalene

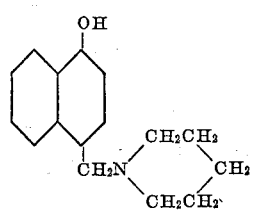

2-hydroxy-1-(N-piperidinomethyl)-naphthalene

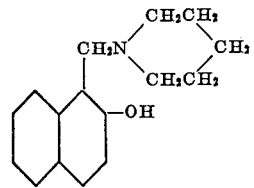

2,5-di-(N-piperidinomethyl)-hydroquinone

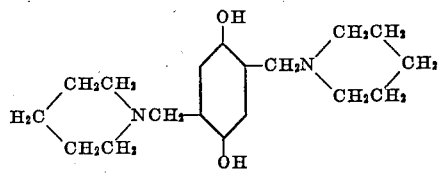

(N-piperidinomethyl)-carbazole

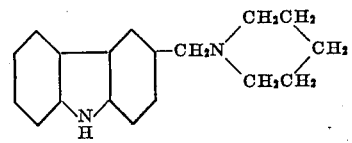

(N-piperidinomethyl)-(p-methalloxyphenylamino)-naphthalene

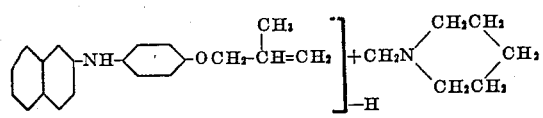

2-amino-1-(N-piperidinomethyl)-naphthalene

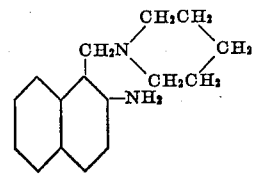

2-hydroxy-1-(N-morpholinomethyl)-naphthalene

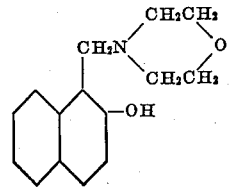

2-hydroxy-1-(N,N-diphenylaminomethyl)-naphthalene

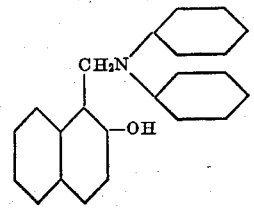

Di-1,4[1'-(2'-hydroxy-5'-methylphenyl)-methyl]-2,3,5,6-tetramethyl-piperazine

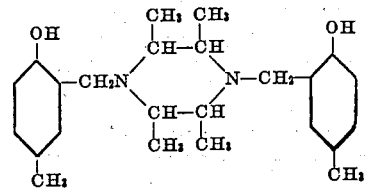

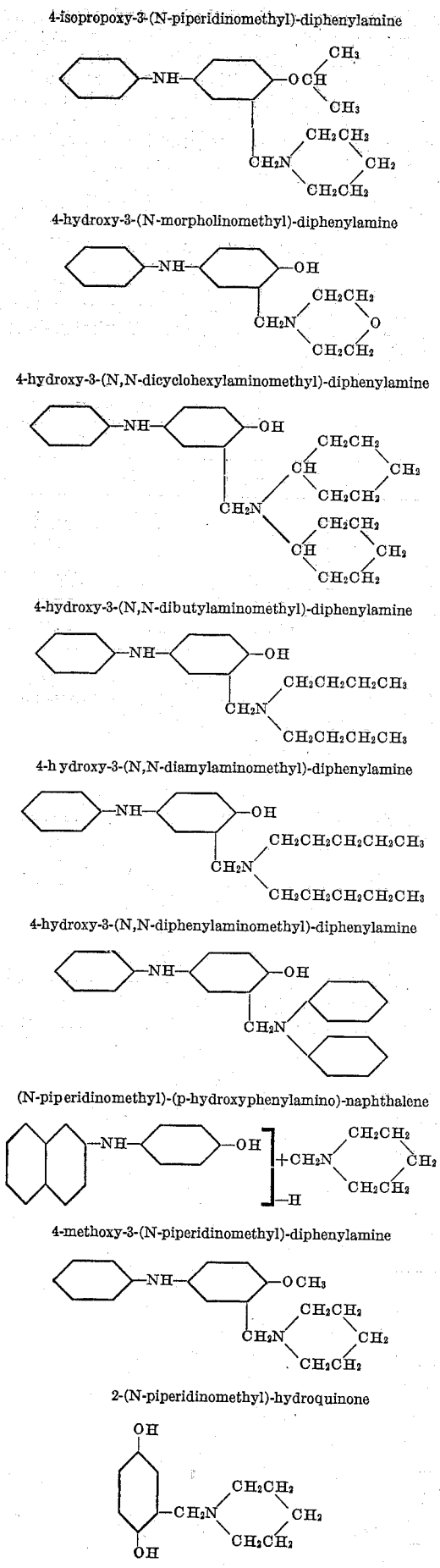
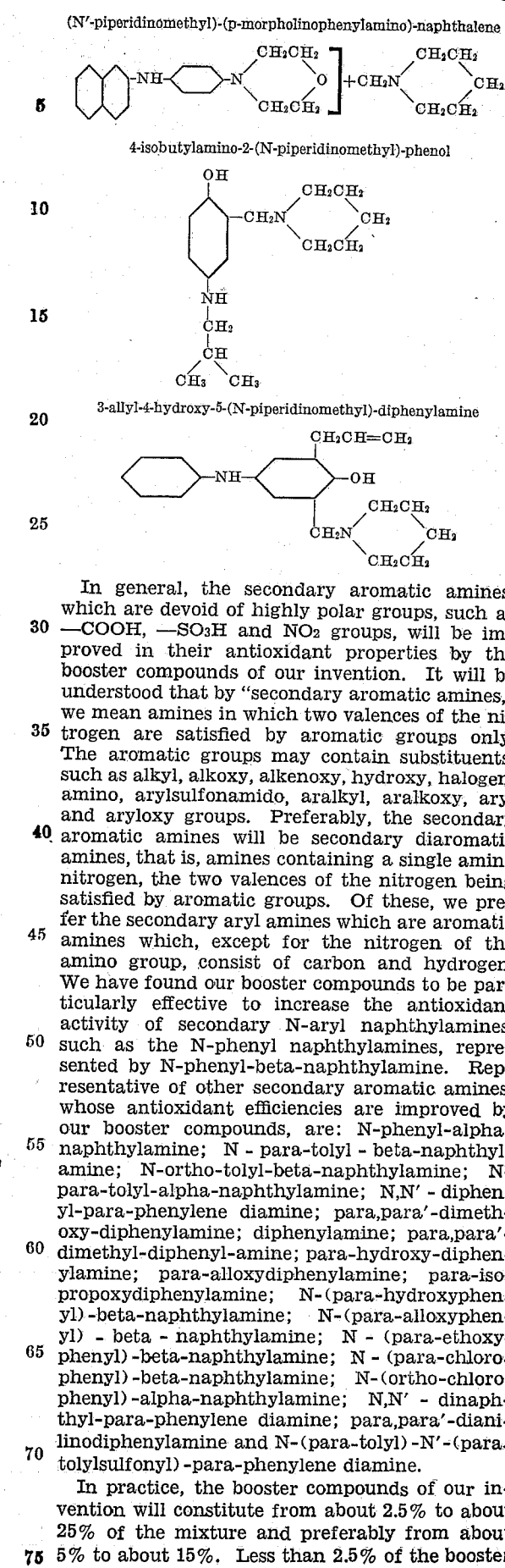

In general, the secondary aromatic amines, which are devoid of highly polar groups, such as —COOH, —SO₃H and NO₂ groups, will be improved in their antioxidant properties by the booster compounds of our invention. It will be understood that by "secondary aromatic amines," we mean amines in which two valences of the nitrogen are satisfied by aromatic groups only. The aromatic groups may contain substituents, such as alkyl, alkoxy, alkenoxy, hydroxy, halogen, amino, arylsulfonamido, aralkyl, aralkoxy, aryl and aryloxy groups. Preferably, the secondary aromatic amines will be secondary diaromatic amines, that is, amines containing a single amino nitrogen, the two valences of the nitrogen being satisfied by aromatic groups. Of these, we prefer the secondary aryl amines which are aromatic amines which, except for the nitrogen of the amino group, consist of carbon and hydrogen. We have found our booster compounds to be particularly effective to increase the antioxidant activity of secondary N-aryl naphthylamines, such as the N-phenyl naphthylamines, represented by N-phenyl-beta-naphthylamine. Representative of other secondary aromatic amines, whose antioxidant efficiencies are improved by our booster compounds, are: N-phenyl-alpha-naphthylamine; N - para-tolyl - beta-naphthylamine; N-ortho-tolyl-beta-naphthylamine; N-para-tolyl-alpha-naphthylamine; N,N' - diphenyl-para-phenylene diamine; para,para'-dimethoxy-diphenylamine; diphenylamine; para,para'-dimethyl-diphenyl-amine; para-hydroxy-diphenylamine; para-alloxydiphenylamine; para-isopropoxydiphenylamine; N-(para-hydroxyphenyl)-beta-naphthylamine; N-(para-alloxyphenyl) - beta - naphthylamine; N - (para-ethoxyphenyl)-beta-naphthylamine; N - (para-chlorophenyl)-beta-naphthylamine; N-(ortho-chlorophenyl)-alpha-naphthylamine; N,N' - dinaphthyl-para-phenylene diamine; para,para'-dianilinodiphenylamine and N-(para-tolyl)-N'-(para-tolylsulfonyl)-para-phenylene diamine.

In practice, the booster compounds of our invention will constitute from about 2.5% to about 25% of the mixture and preferably from about 5% to about 15%. Less than 2.5% of the booster compound usually is insufficient to produce any significant effect. More than 25% of the booster compound up to 50% or more may be used but will produce little, if any, improvement in the antioxidant properties of the mixture over 25% and, in some cases, may be less effective than 25%. The antioxidant mixture will usually be formed prior to incorporation into the rubber. However, the mixture may be formed in the rubber by incorporating the antioxidants into the rubber separately in the specified relative proportions and such production of the mixture in the rubber will be understood to constitute an incorporation of the mixture in the rubber within the scope of our claims. It is to be understood that the term "a rubber" is employed herein and in the claims in a generic sense to include caoutchouc, balata, gutta-percha, latex, synthetic rubber-like materials which are vulcanizable with sulfur and the like.

In order to more clearly illustrate our invention, the preferred modes of carrying the same into effect and the advantageous results to be obtained thereby, a description of the following tests is given:

The tests were made in a rubber mix designed for testing the heat-resistant properties of antioxidants. This stock consists of

| | |
|---|---|
| Smoked sheet | 100 |
| Zinc oxide | 5 |
| Carbon black | 40 |
| Stearic acid | 1 |
| Salicyclic acid | 0.25 |
| Accelerator | 1.75 |
| Activator | 0.2 |
| Sulfur | 1 |
| Antioxidant | 1.5 |

The stocks were always cured for seven minutes at 298° F.

The results of tests on each of N-phenyl-beta-naphthylamine; 4-hydroxy-3-(N-piperidinomethyl)-diphenylamine; (N-piperidinomethyl)-benzimidazole and 1-(N-piperidinomethyl)-2-(phenylamino)-naphthylamine, separately in the test stock are given in Table I.

The common method of determining the degradation of a rubber stock by aging is to measure its tensile strength both before and after aging for various periods of time. In comparing two antioxidants, the losses in tensile strength on aging are compared. This entails the comparison of a series of numbers which generally are not round numbers. In order to render the comparison of the effectiveness of the antioxidants easier, we have in this case compared them to N-phenyl-beta-naphthylamine on a scale in which this material has been assigned a value of 100. This is done by taking the sum of the losses in tensile strength on aging for all tests for each stock and then comparing such sums by arithmetical proportion as illustrated below in which 4-hydroxy-3-(N-piperidinomethyl)-diphenylamine is compared with N-phenyl-beta-naphthylamine.

| N-phenyl-beta-naphthylamine | 4-hydroxy-3-(N-piperidinomethyl)-diphenylamine |
|---|---|
| Original tensile—aged tensile=loss in tensile | |
| 4,125—1,625=2,500 | 3,800—1,725=2,075 |
| 4,125— 475=3,650 | 3,800—1,150=2,650 |
| 4,125— 250=3,875 | 3,800— 375=3,425 |
| 4,125—2,275=1,850 | 3,800—2,550=1,250 |
| 4,125—1,050=3,075 | 3,800—1,525=2,275 |
| 4,125— 300=3,825 | 3,800— 675=3,125 |
| Total loss in tensile =18,775 | =14,800 |

Then, if N-beta-naphthylamine is assigned a value of 100, the efficiency of 4-hydroxy-3-(N-piperidinomethyl)-diphenylamine is $$\frac{18,775}{14,800} \times 100 = 127$$

Calculated in the same way, the efficiencies of the compounds in Table I are listed below:

| | |
|---|---|
| No antioxidant | 90.0 |
| (N-piperidinomethyl)-benzimidazole | 97.5 |
| N-phenyl-beta-naphthylamine | 100.0 |
| 1-(N-piperidinomethyl)-2-phenylaminonaphthalene | 115.0 |
| 4-hydroxy-3-(N-piperidinomethyl)-diphenylamine | 127.0 |

*Table I*

| Days aging | No antioxidant, tensile strength | N-phenyl-beta-naphthylamine, tensile strength | 4-hydroxy-3-(N-piperidinomethyl))-diphenylamine, tensile strength | (N-piperidinomethyl)-benzimidazole, tensile strength | 1-(N-piperidinomethyl)-2-(phenylamino) naphthalene, tensile strength |
|---|---|---|---|---|---|
| | Tested after aging in the 121° C. air oven | | | | |
| 0 | Lbs. per sq. in. 4,100 | 4,125 | 3,800 | 3,675 | 3,725 |
| 2 | 2,075 | 1,625 | 1,725 | 1,450 | 2,025 |
| 5 | 350 | 475 | 1,150 | 425 | 1,325 |
| 7 | 225 | 250 | 375 | 225 | 1,125 |

| Hours aging | Tested after aging in the 260° F. air bomb | | | | |
|---|---|---|---|---|---|
| 8 | 875 | 2,275 | 2,550 | 625 | 1,175 |
| 16 | 175 | 1,050 | 1,525 | 25 | 225 |
| 24 | 25 | 300 | 675 | 25 | 150 |

In Table II are the data obtained for mixtures of two of these compounds with N-phenyl-beta-naphthylamine.

Table II

| Days aging | (N-piperidinomethyl)-benzimidazole, 20% N-phenyl-beta-naphthylamine, 80% | 1-(N-piperidinomethyl)-2-(phenylamino)-naphthalene, 20% N-phenyl-beta-naphthylamine, 80% |
|---|---|---|
| | Tested after aging in the 121° C. air oven | |
| | Tensile strength | Tensile strength |
| 0 | 3,675 | 3,650 |
| 2 | 2,650 | 2,600 |
| 5 | 1,125 | 1,575 |
| 7 | 575 | 1,125 |
| Hours aging | Tested after aging in the 260° F. air bomb | |
| 8 | 2,075 | 2,025 |
| 16 | 700 | 375 |
| 24 | 100 | 225 |

In Table III, the efficiency values for the mixtures in Table II, calculated as in the previous example, are listed under the heading "Efficiency-Found." In Table III is another column, headed "Efficiency-Calculated." The figures in this column are the efficiencies that would be obtained if the antioxidant effect of the mixture was the sum of the effects of the components of the mixture. These values are obtained as illustrated in the following sample calculation. The value for N-phenyl-beta-naphthylamine alone is 100, and for (N-piperidinomethyl)-benzimidazole is 97.5. Then for the 20–80 mixture of these two compounds $$0.20 \times 97.5 + 100 \times 0.80 =$$

the calculated efficiency=

$$19.5 + 80 = 99.5$$

therefore this mixture would be expected to be 99.5% as effective as N-phenyl-beta-naphthylamine.

Table III

| Antioxidant | Percent | Efficiency | |
|---|---|---|---|
| | | Found | Calculated |
| N-phenyl-beta-naphthylamine | 100 | 100.0 | |
| N-phenyl-beta-naphthylamine (N-piperidinomethyl)-bezimidazole | 80 20 | 126.5 | 99.5 |
| N-phenyl-beta-naphthylamine 1-(N-piperidinomethyl)-2-(phenylamino)-naphthalene | 80 20 | 134.5 | 103 |

The efficiency values found by actual test are much higher than would be expected from such mixtures. It is worthy of note that, in both cases in Table III, the mixtures are better antioxidants than either of the ingredients alone.

The efficiencies of several other mixtures are shown in Table IV.

Table IV

| Composition of mixture | Percent | Efficiency | |
|---|---|---|---|
| | | Found | Calculated |
| N-phenyl-beta-naphthylamine | 80 | 114.5 | 101.0 |
| 1-hydroxy-4-(N-piperidinomethyl)-naphthalene | 20 | | |
| N-phenyl-beta-naphthylamine | 80 | 105.5 | 99.0 |
| 2-hydroxy-1-(N-piperidinomethyl)-naphthalene | 20 | | |
| N-phenyl-beta-naphthylamine | 80 | 168.5 | 108.5 |
| 2,5-di-(N-piperidinomethyl)-hydroquinone | 20 | | |
| N-phenyl-beta-naphthylamine | 80 | 139.5 | 104.0 |
| (N-piperidinomethyl)-carbazole | 20 | | |
| N-phenyl-beta-naphthylamine | 80 | 149.5 | 105.0 |
| (N-piperidinomethyl)-(para-hydroxyphenylamino)-naphthalene | 20 | | |
| N,N'-diphenyl-para-phenylene diamine | 50 | 124.5 | 117.0 |
| 4-hydroxy-3-(N-piperidinomethyl)-diphenylamine | 50 | | |
| Para-tolyl-beta-naphthylamine | 75 | 127.0 | 114.5 |
| 4-hydroxy-3-(N-piperidinomethyl)-diphenylamine | 25 | | |
| Para-tolyl-beta-naphthylamine | 57 | 129.5 | 115.5 |
| 4-hydroxy-3-(N-piperidinomethyl)-diphenylamine | 43 | | |

These results show that this effect is not peculiar to N-phenyl-beta-naphthylamine, but is also obtained with other secondary diaromatic amines.

The results, obtained with mixtures containing more than two components, are shown in Table V.

Table V

| Composition of mixture | Per cent | Efficiency | |
|---|---|---|---|
| | | Found | Calculated |
| 4-hydroxy-3-(N-piperidinomethyl)-diphenylamine | 12.5 | 137.5 | 114.0 |
| N,N'-diphenyl-para-phenylene diamine | 12.5 | | |
| N-(para-tolyl)-beta-naphthylamine | 75 | | |
| 4-hydroxy-3-(N-piperidinomethyl)-diphenylamine | 25 | | |
| N,N'-diphenyl-para-phenylene diamine | 25 | 122.5 | 115.0 |
| N-(para-tolyl)-beta-naphthylamine | 50 | | |
| 4-hydroxy-3-(N-piperidinomethyl)-diphenylamine | 12.5 | | |
| N,N'-diphenyl-ethylene diamine | 12.5 | 138.0 | 113.5 |
| N-(para-tolyl)-beta-naphthylamine | 75 | | |
| 4-hydroxy-3-(N-piperidinomethyl)-diphenylamine | 25 | | |
| N,N'-diphenyl-ethylene diamine | 25 | 136.0 | 114.0 |
| N-(para-tolyl)-beta-naphthylamine | 50 | | |
| 4-hydroxy-3-(N-piperidinomethyl)-diphenylamine | 25 | | |
| N,N'-diphenylbenzidine | 25 | 141.5 | 118.0 |
| N-(para-tolyl)-beta-naphthylamine | 50 | | |

These mixtures, containing three components also show an appreciable boosting effect.

Table VI shows several other booster compounds that may be used for this purpose. It is to be particularly noted that, although several of these compounds are inferior to N-phenyl-beta-naphthylamine, when tested alone (figures given in the table), they nevertheless produce this boosting effect.

Table VI

| Composition | Efficiency |
|---|---|
| 2-amino-1-(N-piperidinomethyl)-naphthalene | 103.5 |
| 2-hydroxy-1-(N-morpholinomethyl)-naphthalene | 96 |
| 2-hydroxy-1-(N, N-diphenylaminomethyl)-naphthalene | 105.5 |
| Di-1,4-[1'-(2'-hydroxy-5'-methylphenyl)-methyl]-2,3,4,6-tetramethylpiperazine | 101 |
| 4-isopropoxy-3-(N-piperidinomethyl)-diphenylamine | 97 |
| 4-hydroxy-3-(N-morpholinomethyl)-diphenylamine | 127 |
| 4-hydroxy-3-(N, N-dicyclohexylaminomethyl)-diphenylamine | 96.5 |
| 4-hydroxy-3-(N, N-dibutylaminomethyl)-diphenylamine | 105 |
| 4-hydroxy-3-(N, N-diamylaminomethyl)-diphenylamine | 106.5 |

| Composition | Efficiency |
|---|---|
| 4-hydroxy-3-(N, N-diphenylaminomethyl)-diphenylamine | 109 |
| (N-piperidinomethyl)-(para-hydroxy-phenylamino)-naphthalene | 127.5 |
| 4-methoxy-3-(N-piperidinomethyl)-diphenylamine | 100.5 |
| 2-(N-piperidinomethyl)-hydroquinone | 112 |
| (N'-piperidinomethyl)-(para-morpholino phenylamino)-naphthalene | 112.5 |
| 4-isobutylamino-2-(N-piperidinomethyl)-phenol | 126.5 |
| 3-allyl-4-hydroxy-5-(N-piperidinomethyl)-diphenylamine | 118.5 |

It will be understood that the preceding tests and the specific embodiments disclosed are given for illustrative purposes only and that many variations and modifications may be made therein without departing from the spirit or scope of our invention and we intend to claim our invention broadly as in the appended claims. It will be evident that antioxidant mixtures, other than those specifically disclosed, may be employed and that the antioxidant mixtures may be used in other rubbers and rubber stocks.

Methods of preparing compounds, of the structure of the booster compounds of our invention, are known to the art and are described in Patent 2,181,719 to Baird et al. The reaction may be represented by the following equation:

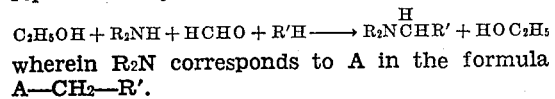

wherein $R_2N$ corresponds to A in the formula $A\text{---}CH_2\text{---}R'$.

Some of the secondary amines, $R_2NH(AH)$, that may be used in preparing the booster compounds for carrying out this invention, are dimethylamine, diethylamine, dipropylamine, di-isopropylamine, dicyclopentylamine, dicyclohexylamine, the ditolylamines, piperidine, morpholine, thiomorpholine, the hexahydropicolines, the hexahydrolutidines, tetrahydroquinoline, decahydroquinoline, tetrahydroisoquinoline, phenazine, carbazole, indole, dihydroindole, pyrrole, pyrroline, pyrrolidine, hexamethylene imine, piperazine, tetramethylpiperazine and the like.

Some of the compounds, R'H, which will react to produce booster compounds of our invention, are alpha-naphthol, beta-naphthol, alpha-naphthylamine, N-phenyl-beta-naphthylamine, benzimidazole, 2-methylbenzimidazole, 2-mercaptobenzimidazole, 2-phenyl-benzimidazole, benzothiazole, 2-phenylbenzathiazole, carbazole, dibenzodioxane, benzofurane, dibenzofurane, thiodiphenylamine, phenoxozine, benzothiophene, para-hydroxydiphenylamine, para-methoxydiphenylamine, para-alloxydiphenylamine, N-(para-hydroxyphenyl)-beta-naphthylamine, N-(para-aminophenyl)-alpha-naphthylamine, N-(para-ethoxyphenyl)-beta-naphthylamine, N-(para-ethylaminophenyl)-beta-naphthylamine, hydroquinone, para-propoxyaniline, the monomethyl ether of hydroquinone, hydronaphthoquinone, para-aminophenol, benzoxazole and the like.

From the above, it will be appreciated that we have provided a method for increasing the resistance of a rubber to deterioration, particularly at elevated temperatures without increasing the amount of antioxidant employed. Also, it will be apparent that we can obtain a predetermined resistance to deterioration in a rubber by the use of smaller amounts of antioxidant. Because of the small amount of the booster compound required in the mixture, the cost of such compound has very little effect on the cost of the resulting rubber product and hence we are able to obtain improved stabilization of rubbers with substantially no increase in cost or, if desired, to obtain a predetermined degree of stabilization thereof at substantially lower cost.

We claim:

1. The method of inhibiting the deterioration of a rubber at elevated temperatures in the presence of oxygen which comprises incorporating in the rubber a mixture containing about 25% to about 2.5% of a compound of the formula $A\text{---}CH_2\text{---}R'$ wherein A represents a secondary amino group in which the free valence belongs to the amino nitrogen and R' represents an aromatic group having from 1 to 2 members of the group consisting of oxy and amino radicals substituted on the aromatic ring attached to the $CH_2$, which compound is devoid of strongly negative groups of the character of $\text{---COOH}$, $\text{---SO}_3\text{H}$ and $\text{---NO}_2$ groups, and about 75% to about 97.5% of a different secondary diaromatic amine devoid of strongly negative groups of the character of $\text{---COOH}$, $\text{---SO}_3\text{H}$ and $\text{---NO}_2$ groups.

2. The method of inhibiting the deterioration of a rubber at elevated temperatures in the presence of oxygen which comprises incorporating in the rubber a mixture containing about 25% to about 2.5% of a compound of the formula $A\text{---}CH_2\text{---}R'$ wherein A represents a secondary amino group in which the two valences of the nitrogen are satisfied by separate carbon atoms of 1 to 2 hydrocarbon radicals and the free valence belongs to the amino nitrogen and R' represents an aromatic group having from 1 to 2 members of the group consisting of oxy and amino radicals substituted on the aromatic ring attached to the $CH_2$, which compound is devoid of strongly negative groups of the character of $\text{---COOH}$, $\text{---SO}_3\text{H}$ and $\text{---NO}_2$ groups, and about 75% to about 97.5% of a different secondary diaromatic amine devoid of strongly negative groups of the character of $\text{---COOH}$, $\text{---SO}_3\text{H}$ and $\text{---NO}_2$ groups.

3. The method of inhibiting the deterioration of a rubber at elevated temperatures in the presence of oxygen which comprises incorporating in the rubber a mixture containing about 25% to about 2.5% of a compound of the formula $A\text{---}CH_2\text{---}R'$ wherein A represents a secondary amino group in which the two valences of the nitrogen are satisfied by the terminal carbon atoms of a chain containing at least 4 carbon atoms and the free valence belongs to the amino nitrogen and R' represents an aromatic group having from 1 to 2 members of the group consisting of oxy and amino radicals substituted on the aromatic ring attached to the $CH_2$, which compound is devoid of strongly negative groups of the character of $\text{---COOH}$, $\text{---SO}_3\text{H}$ and $\text{---NO}_2$ groups, and about 75% to about 97.5% of a different secondary diaromatic amine devoid of strongly negative groups of the character of $\text{---COOH}$, $\text{---SO}_3\text{H}$ and $\text{---NO}_2$ groups.

4. The method of inhibiting the deterioration of a rubber at elevated temperatures in the presence of oxygen which comprises incorporating in the rubber a mixture containing about 25% to about 2.5% of a compound of the formula $A\text{---}CH_2\text{---}R'$ wherein A represents a piperidino group in which the free valence belongs to the amino nitrogen and R' represents an aromatic group having from 1 to 2 members of the group consisting of oxy and amino radicals substituted on the aromatic ring attached to the $CH_2$, which compound is devoid of strongly negative groups of the character of $\text{---COOH}$, $\text{---SO}_3\text{H}$ and $\text{---NO}_2$ groups, and about 75% to about 97.5% of a different secondary diaromatic amine devoid of strongly negative groups of the character of —COOH, —SO₃H and —NO₂ groups.

5. The method of inhibiting the deterioration of a rubber at elevated temperatures in the presence of oxygen which comprises incorporating in the rubber a mixture containing about 25% to about 2.5% of 4-hydroxy-3-(N-piperidinomethyl)-diphenylamine, and about 75% to about 97.5% of a different secondary diaromatic amine devoid of strongly negative groups of the character of —COOH, —SO₃H and —NO₂ groups.

6. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a secondary amino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a secondary diaryl amine.

7. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a secondary amino group in which the two valences of the nitrogen are satisfied by separate carbon atoms of 1 to 2 hydrocarbon radicals and the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a secondary diaryl amine.

8. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a piperidino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a secondary diaryl amine.

9. The method of inhibiting the deterioration of a rubber at elevated temperatures in the presence of oxygen which comprises incorporating in the rubber a mixture containing about 25% to about 2.5% of 4-hydroxy-3-(N-piperidinomethyl)-diphenylamine, and about 75% to about 97.5% of a secondary diaryl amine.

10. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a secondary amino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a secondary N-aryl naphthylamine in which the aryl group is of the benzene series.

11. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a secondary amino group in which the two valences of the nitrogen are satisfied by separate carbon atoms of 1 to 2 hydrocarbon radicals and the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a secondary N-aryl naphthylamine in which the aryl group is of the benzene series.

12. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a piperidino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a secondary N-aryl naphthylamine in which the aryl group is of the benzene series.

13. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a secondary amino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H, and —NO₂ groups, and about 75% to about 97.5% of N-phenyl-beta-naphthylamine.

14. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a secondary amino group in which the two valences of the nitrogen are satisfied by separate carbon atoms of 1 to 2 hydrocarbon radicals and the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₂H and —NO₂ groups, and about 75% to about 97.5% of N-phenyl-beta-naphthylamine.

15. The method of inhibiting the deterioration of a rubber at elevated temperatures in the presence of oxygen which comprises incorporating in the rubber a mixture containing about 25% to about 2.5% of a compound of the formula A—CH₂—R' wherein A represents a piperidino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₂H and —NO₂ groups, and about 75% to about 97.5% of N-phenyl-beta-naphthylamine.

16. The method of inhibiting the deterioration of a rubber at elevated temperatures in the presence of oxygen which comprises incorporating in the rubber a mixture containing about 25% to about 2.5% of 4-hydroxy-3-(N-piperidinomethyl)-diphenylamine, and about 75% to about 97.5% of N-phenyl-beta-naphthylamine.

17. Rubber having incorporated therein a mixture containing about 25% to about 2.5% of a compound of the formula A—CH₂—R' wherein A represents a secondary amino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₂H and —NO₂ groups, and about 75% to about 97.5% of a different secondary diaromatic amine devoid of strongly negative groups of the character of —COOH, —SO₃H and —NO₂ groups.

18. Rubber having incorporated therein a mixture containing about 25% to about 2.5% of a compound of the formula A—CH₂—R' wherein A represents a piperidino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a different secondary diaromatic amine devoid of strongly negative groups of the character of —COOH, —SO₃H and —NO₂ groups.

19. Rubber having incorporated therein a mixture containing about 25% to about 2.5% of a compound of the formula A—CH₂—R' wherein A represents a secondary amino group in which the two valences of the nitrogen are satisfied by separate carbon atoms of 1 to 2 hydrocarbon radicals and the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of a secondary diaryl amine.

20. Rubber having incorporated therein a mixture containing about 25% to about 2.5% of a compound of the formula A—CH₂—R' wherein A represents a secondary amino group in which the free valence belongs to the amino nitrogen and R' represents an aromatic group having from 1 to 2 members of the group consisting of oxy and amino radicals substituted on the aromatic ring attached to the CH₂, which compound is devoid of strongly negative groups of the character of —COOH, —SO₃H and —NO₂ groups, and about 75% to about 97.5% of N-phenyl-beta-naphthylamine.

ARTHUR M. NEAL.
JOHN R. VINCENT